United States Patent [19]

Panandiker et al.

[11] 4,055,551
[45] Oct. 25, 1977

[54] CONTINUOUS PROCESS FOR THE PRODUCTION OF BLOCKED ISOCYANATES

[75] Inventors: K. A. Pai Panandiker, Maple Grove, Minn.; David E. Tweet, Carpentersville, Ill.

[73] Assignee: Cargill, Incorporated, Minneapolis, Minn.

[21] Appl. No.: 748,497

[22] Filed: Dec. 8, 1976

[51] Int. Cl.² .................................... C08G 18/02
[52] U.S. Cl. .................... 260/77.5 AA; 260/77.5 AT; 260/77.5 TB
[58] Field of Search ............ 260/77.5 TB, 77.5 AT, 260/77.5 AA

[56] References Cited

U.S. PATENT DOCUMENTS

| 3,393,177 | 7/1968 | Guest et al. | 260/77.5 TB |
| 3,718,622 | 2/1973 | Camilleri et al. | 260/77.5 AN |
| 3,846,378 | 11/1974 | Griswold | 260/77.5 TB |

Primary Examiner—Eugene C. Rzucidlo
Attorney, Agent, or Firm—Fitch, Even, Tabin & Luedeka

[57] ABSTRACT

A method for manufacturing blocked isocyanate curing agents in which a polyisocyanate and a blocking agent for the polyisocyanate are separately and continuously metered into a reaction zone in stoichiometric proportion under reaction conditions, and in which the reaction mixture is continuously withdrawn from the reaction zone to provide a blocked isocyanate curing agent product.

11 Claims, 1 Drawing Figure

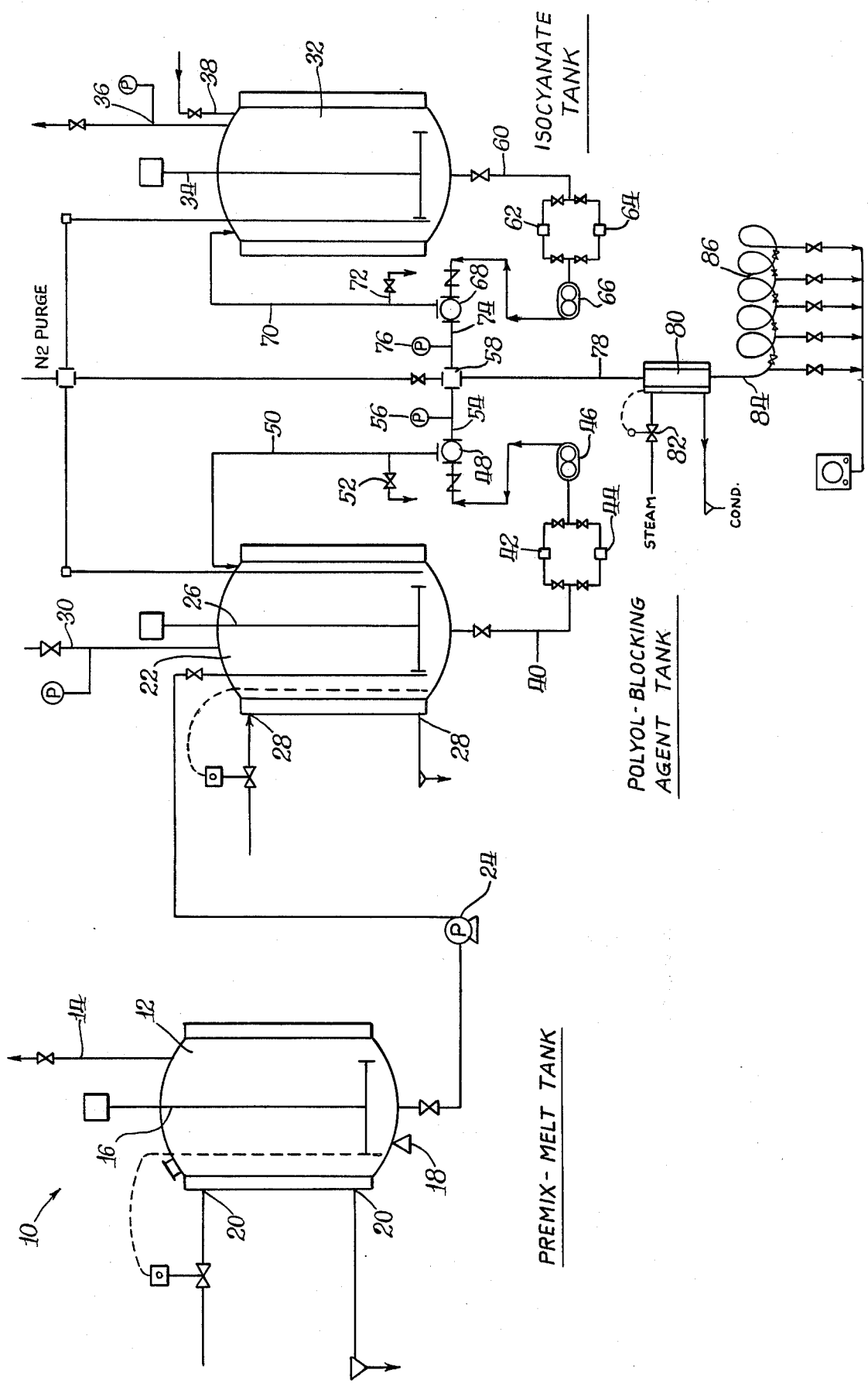

CONTINUOUS PROCESS FOR THE PRODUCTION OF BLOCKED ISOCYANATES

The present invention is directed to the manufacture of curing agents, and, more particularly, is directed to the production of blocked isocyanate curing agents which are particularly useful in the curing of powder coating compositions.

Powder coating compositions and techniques have conventionally been used in the provision of protective films, and powder coating technology is becoming increasingly important for both economic and environmental reasons. Powder coating technology includes fluidized bed sintering techniques (such as electrostatic fluidized bed coating) and spray coating methods (such as electrostatic powder coating) which may be used or adapted for use with the various types of powder coating compositions. The compositions themselves may desirably be adapted and formulated to be, initially, sufficiently fluid to be capable of forming a film on the substrate under the coating conditions. The film may be subsequently curable by further polymerization and/or crosslinking.

Suitably formulated coating compositions may comprise a mixture of a repolymer (or polymer) having reactive groups such as hydroxyl groups, and a curing agent which is reactive with the polymer. Conventional curing agents for polymers or prepolymers having reactive hydroxyl groups include polyfunctional "blocked" isocyanate crosslinking agents in which the isocyanate groups are reacted with a blocking agent capable of splitting off at elevated curing temperatures to regenerate isocyanate functionality. The regenerated isocyanate may in turn react with the hydroxyl groups of the polymer to cure the film.

Blocked isocyanate prepolymer curing agents are conventionally prepared by reacting the polyisocyanate prepolymer with a suitable blocking agent, such as a lactam or a ketoxime. Lactam and ketoxime blocked polyisocyanate curing agents are conventionally produced in a batch-wise process in which a polyol, such as trimethylol propane, and a stoichiometric excess of a polyisocyanate, such as isophorone diisocyanate, are reacted to produce urethane prepolymers of suitable molecular weight and composition and having terminal, unreacted isocyanate groups. These urethane prepolymers with free isocyanate groups conventionally may be further reacted in a batch processing reaction vessel with a blocking agent such as epsilon caprolactam or methyl ethyl ketoxime to produce the desired curing agents. Suitable reaction catalysts are conventionally used to promote the reactions, and are well known in the art [e.g., "Metal Organic Catalysts" by J. W. Britain et al., J. Appl. Polymer Science, Volume 4, p. 207 (1960)].

There are, however, various problems connected with the conventional manufacture of such curing agents. For example, one major problem encountered in connection with the production of epsilon-caprolactam blocked, trimethylol propane-isophorone diisocyanate prepolymers, is the formation of gel particles at the surface of the reaction mass. These gel particles coat the reaction surfaces and internal coils, and can lead to processing problems such as filtering difficulties. It is theorized that the gel problem may be due to high local concentration of the reactants, and inability of the trimethylol propane to dissolve completely, and may occur during the urethane prepolymer stage. Another difficulty is the formation of color in the finished curing agent, which is deleterious to the color of the powder coating cured with the curing agent. For example, there are substantial difficulties in producing methyl ethyl ketoxime blocked, trimethylol propane-isophorone diisocyanate prepolymer curing agents without providing a dark colored finished product. These color difficulties are theorized to be mainly due to the length of time at reaction temperature, although since (as will be further indicated hereinafter) batch processes tend to produce higher softening point resins, the development of color may also be due to side reactions.

Accordingly, there is a need for improved methods of production of blocked isocyanate curing agents, and it is an object of the present invention to provide such a method. It is a further object to provide a method for continuously producing a light-colored, blocked isocyanate curing agent and for reducing the problems of gel particle formation.

These and other objects of the present invention will become apparent to those skilled in the art in view of the following detailed description and the accompanying drawing, of which FIG. 1 is a schematic representation of apparatus adapted to carry out an embodiment of the present invention.

Generally, the present invention is directed to a method for manufacturing blocked isocyanate curing agents which are the reaction products of a blocking agent and a polyfunctional isocyanate. In accordance with the method, the blocking agent and polyisocyanate reactants are simultaneously metered in stoichiometric ratio in respect of blocking agent-isocyanate reactivity, and continuously mixed and conducted into a reaction zone where the reaction mixture is maintained at a reaction temperature in the range of from about 280° F to about 400° F, and preferably above the unblocking temperature of the blocking agent for at least a portion of the reaction residence time. By "stoichiometric ratio" is meant a ratio of substantially one mole equivalent of free isocyanate functionality for each mole equivalent of blocking agent functionality. The reactants are maintained in the reaction zone for a sufficient time to reduce the free isocyanate functionality of the reaction product to at least a predetermined level indicating substantial completion of the reaction, and the reaction mixture is continuously withdrawn from the reaction zone to provide a high quality curing agent product. As indicated, the isocyanate blocking reaction is preferably conducted at a temperature above the unblocking temperature of the blocking agent with respect to the isocyanate, and may desirably utilize a residence reaction time of from about 15 to about 60 seconds at such temperature. The unblocking temperature is a function of both the isocyanate and the blocking agent, and the unblocking temperature for specific combinations of components may be readily determined. In this connection, the unblocking temperature for toluene diisocyanate (TDI)-epsilon caprolactam is about 320° F, for TDI-methyl ethyl ketoxime is about 280° F, for isophorone diisocyanate (IPDI)-epsilon caprolactam is about 360° F and for IPDI-methyl ethyl ketoxime is about 320° F. Blocked isocyanates may also be made at below the unblocking temperature of the blocking agent with a longer residence time in the range of, say, from about 120 to about 150 seconds.

As indicated, the reactants are polyfunctional isocyanates and blocking agents for said polyfunctional isocyanates. The polyfunctional isocyanates utilizable in the preparation of blocked curing agents are well known as a class of materials, and may include conventional aliphatic and aromatic isocyanates (including polyisocyanate-polyol prepolymers) having at least two isocyanate groups. Particularly preferred isocyanates are 3-isocyanatomethyl-3, 5, 5 trimethylcyclohexylisocyanate, which is more commonly referred to as isophorone diisocyanate or "IPDI", and toluene diisocyanate, which is also known as "TDI". Other aromatic, aliphatic, cycloaliphatic and arylaliphatic polyisocyanates such as hexamethylene diisocyanate, 4,4= diisocyanato-diphenyl methane and 4,4' methylene bis(cyclo-hexyl isocyanate) are also contemplated. Isocyanate prepolymers formed from a predetermined stoichiometric excess of a polyisocyanate and a polyol are particularly preferred isocyanate reactants for the present process. In this connection, the polyol reacts with the polyisocyanate to provide a prepolymer with urethane linkages, and the molecular weight of the prepolymer may be generally controlled by varying the specific ratio of isocyanate and polyol components employed. Polyols having a hydroxyl functionality of more than two may be advantageously used to increase the isocyanate functionality of the resulting prepolymer, particularly in the case of diisocyanates, which enhances the crosslinking capability of the resulting polyisocyanate prepolymer curing agent. Suitable polyol compounds for blocked polyisocyanate curing agent compounds are also well known to those skilled in the art. Particularly preferred polyols include trimethylol propane, which may be reacted with an excess of a difunctional isocyanate such as isophorone diisocyanate to provide a trifunctional isocyanate prepolymer having internal urethane linkages which are advantageous for various types of coating compositions. Other suitable polyols such as alkylene glycols and other aliphatic diols and triols (e.g., mixtures of pentaerithritol and ethylene glycol), hydroxy-capped polycaprolactones (e.g., PCP-0300 product of Union Carbide), trimethylol ethane, tris(hydroxy ethyl) isocyanurate, and mixtures thereof are also contemplated.

When it is desired to use a polyol-polyisocyanate prepolymer as the isocyanate component of the curing agent, the prepolymer may either be preformed, or its polyisocyanate and polyol components may be simultaneously metered in the desired equivalent ratio into the reaction zone together with the blocking agent, the equivalent amount of the blocking agent introduced into the reaction zone of course being based on the "free" isocyanate functionality of the polyol-polyisocyanate prepolymer, rather than on the isocyanate before reaction with the polyol polymer. By "free" isocyanate functionality in this context is meant the excess isocyanate functionality after subtracting the polyol hydroxyl functionality.

Suitable blocking agents for isocyanates include ketoximes and lactams, and this class of suitable blocking agents is well known in connection with isocyanate curing agents. Particularly preferred curing agents are epsilon caprolactam and methyl ethyl ketoxime, and mixtures thereof.

The present invention will now be more particularly described with reference to the drawing of FIG. 1, which represents a schematic drawing of apparatus 10 adapted to carry out an embodiment of the present invention.

In the apparatus of FIG. 1, a premix melt tank 12 is provided with appropriate venting 14, mixing 16, loading 18 and steam service 20 apparatus. A suitably proportioned mixture of the blocking agent component and the polyol component may be introduced into and mixed in the premix melt tank at a temperature appropriate to the particular materials utilized. The polyol and blocking agent will be added and mixed to provide the desired, predetermined ratio of these components to the reaction zone. The polyol-blocking agent mixture may be transferred to the polyol-blocking agent tank 22 by means of pump 24. The polyol-blocking agent tank 22 is similarly provided with mixing 26, steam service 28 and vent 30 apparatus. The polyol-blocking agent tank serves as a reservoir for these components of the reaction process. A polyisocyanate tank 32 is also provided having suitable mixing 34, venting 36 and filling 38 apparatus, and which similarly serves as a reservoir for the isocyanate component of the reaction process.

The polyol-blocking agent tank 22 is provided with a metering conduit 40 including suitable filters 42, 44 and a metering pump 46. The metering pump directs the polyol-blocking agent mixture to a three-way valve 48, one outlet of which is directed to a recycle line 50 which returns to the polyol blocking agent tank 22. The recycle line 50 includes manual calibration apparatus 52 which may be used to calibrate the flow controlled by the metering pump 46 when the three-way valve 48 is directed so that the recycle line 50 is the only outlet. The other outlet of the three-way valve 48 is the process outlet line 54 which includes appropriate measuring gauges 56. The process outlet line 54 serves as an input feed to three-way valve 58.

Similarly, the polyisocyanate tank is provided with a polyisocyanate metering conduit 60 including appropriate filters 62, 64 and metering pump 66. The polyisocyanate metering pump 66 similarly feeds into a three-way valve 68 which has as one outlet a recycle line 70 which is directed back into the polyisocyanate tank 32. The polyisocyanate recycle line is also provided with appropriate manual calibration apparatus 72. The other outlet of the three-way isocyanate valve 68 is the polyisocyanate process outlet line 74 which is similarly provided with appropriate pressure and other measuring apparatus 76. The process outlet line from this isocyanate metering and delivery system serves as the other inlet to the three-way valve 58, the first inlet being the polyol-blocking agent process outlet line 54, as described hereinabove.

Through appropriate adjustment of the respective metering pumps 46 and 66, the polyol-blocking agent component and the polyisocyanate component may, accordingly, be metered in the desired stoichiometric ratio to the three-way valve 58 on a continuous and simultaneous basis to provide a reactant feed, mixed in proper stoichiometric proportion, into the reactant feed line 78. The reactant feed line discharges into the reaction mixing zone 80 which is a static mixer to intimately mix the isocyanate and blocking agent, the outer surface of which in the illustrated embodiment may be maintained through steam service jacketing 82 at a preselected temperature which may depend on the type of blocking agent employed in the process.

The curing agent reaction mixture is, concomitantly with the introduction of the feed materials into the reaction mixing zone by means of a feed line 78, conducted from the mixing zone 80 by means of a product line 84, to the reaction coils 86 and subsequently cooled and processed. The reaction coils 86 provide reaction residence time, and the reaction mixing zone 80 and the reaction coil zone 86 cooperate to provide appropriate mixing and reaction time-temperature conditions in an over-all continuous process system reaction zone. The blocking agent-polyisocyanate reaction is exothermic, and accordingly provides heat in this reaction zone which may be catalyzed to produce a peak reaction exotherm temperature in the reaction zone. The reaction temperature in the reaction zone, as indicated, will best be maintained at a temperature above the unblocking temperature of the particular blocking agent, and the zone, including the mixing zone 80, product line 84 and reaction coil 86 will be of sufficient volumetric capacity such that at the introduction rate of the reactant feed from line 78, the reaction mixture will be maintained in the reaction zone for a sufficient length of time to provide for substantial completion of the polyisocyanate-blocking agent reaction in respect of the cooled reaction product. Substantial completion of the reaction is indicated by the presence of less than 2%, and preferably, less than 1%, of isocyanate groups, based on the number of free isocyanate groups of the isocyanate or isocyanate prepolymer reactant. Generally, the reactants will be maintained in the reaction zone for a period of time in the range of from about 15 to about 300 seconds, and the volume of the reaction zone and the metering rate of the reactants will be adjusted to provide for an appropriate reaction zone retention time.

Of course, the reaction mixture should not be held at high reaction temperature and for long residence time conditions which are overly deleterious to the final product; for example, for methyl ethyl ketoxime blocked isocyanates, the reaction should not be held for longer than 90 seconds at 280°-320° F because of development of dark color.

The finished product may be discharged from the coil 86 to a cooling belt for cooling and subsequent processing of the finished curing agent.

The manufacturing apparatus 10 is particularly adapted to carry out a preferred aspect of the present invention in which the final product is a blocked isocyanate-polyol prepolymer, and in which the blocking agent, isocyanate, and the polyol are simultaneously metered and reacted together in the reaction zone. It will be appreciated that separate metering and delivery systems might be provided for the polyol component and the blocking agent component, respectively, but such an approach adds metering equipment to the system, the use of which can be avoided by premixing these components. However, blocked polyol-isocyanates may also be manufactured through the use of a preformed polyol-isocyanate prepolymer.

In the preformed prepolymer approach, the desired equivalent excess of isocyanate is first reacted with a polyhydric alcohol to produce an isocyanate-capped prepolymer of desired molecular weight and properties. This reaction may be continuous, or may be performed in a batch manner and, like the blocking agent reaction, may be catalyzed through the use of a suitable reaction catalyst. The prepolymer reaction product is subsequently continuously reacted with the blocking agent under conditions in accordance with the present invention. For example, in the prepolymer method, isophorone diisocyanate may be reacted with trimethylol propane in a molar ratio of, say, about 3:1 under appropriate elevated temperature conditions to provide upon completion of the urethane-linkage formation reaction, a prepolymer which is substantially trifunctional in respect of isocyanate reactivity. The prepolymer and epsilon-caprolactam blocking agent, in the stoichiometrically correct ratio based on the prepolymer isocyanate functionality (and including a suitable catalyst), may, for example, be mixed and maintained for 60-90 seconds residence time in a reaction zone at a suitable reaction temperature to produce the blocked polyisocyanate curing agent.

However, in view of the fact that the prepolymer is more viscous than the polyol and isocyanate components, and in view of the difficulties in processing the more viscous prepolymer, it is preferred, as indicated hereinabove, that the blocking agent, polyol and isocyanate be continuously and simultaneously mixed and reacted without first forming the prepolymer (hereinafter referred to as the "one shot" method). In the one shot method, for example, isophorone diisocyanate may be used as one reaction component stream, and a trimethylol propane-epsilon caprolactam mixture may be used as the other reaction component stream, and each component may be heated to a suitable temperature for processing (e.g., about 100° F for the isophorone diisocyanate and about 225° F for the trimethylol propane-epsilon caprolactam mixture). Dibutyl tin dilaurate is added to the trimethylol propane-epsilon caprolactam mixture. The two component streams may be brought together by proportionating pumps in the desired mix ratio, held in a reaction zone (e.g., for about 90 seconds residence time) at elevated temperature (e.g., a peak reaction exotherm temperature of about 390°-400° F.) to produce the epsilon caprolactam blocked curing agent product. Comparison of processing with epsilon caprolactam vs. methyl ethyl ketoxime as the blocking agent indicates that the methyl ethyl ketoxime blocking agent does not require as long a residence time (e.g., to reduce free isocyanate content below an 0.8 percent level) as the epsilon caprolactam when using trimethylol propane and isophorone diisocyanate as the other reaction components. However, the peak exotherm reached by each curing agent is important to reduce analytically measured final (free) isocyanate content, which is employed as the measure of completeness of the reaction. A longer residence time and lower temperature may also be utilized to complete the reaction and reduce the final isocyanate content. An optimum combination of utilizing the exothermic heat of reaction to establish a peak exothermic temperature, and controlling the residence time in the reaction zone is desirable for producing epsilon caprolactam and methyl ethyl ketoxime blocked products. To hasten the reaction to reach a peak exotherm, a suitable catalyst such as dibutyl tin dilaurate may be used, and such catalysts may be premixed with the blocking agent or blocking agent-polyol components. The peak exotherm reached may be substantially higher than the unblocking temperature for each curing agent, but has not been found to be detrimental to the finished product. The continuous method of the present invention produces a curing agent having a slightly lower softening point than a batch-processed curing agent. This lowering is not detrimental to storage stability of the finished powder, and as a practical matter, the continuous method will generally produce a more uniform product as compared to the batch process.

The following examples illustrate various aspects of the present invention.

EXAMPLE I

A blocked isocyanate prepolymer curing agent is prepared in a laboratory scale run by continuously introducing a mixture of trimethylol propane (TMP) and methyl ethyl ketoxime (MEKO) as one input feed to a reaction zone (the "A" side) and simultaneously and stoichiometrically continuously introducing isophorone diisocyanate (IPDI) as the other input feed to the reaction zone of the equipment (the "B" side). The IPDI component was held at 30° C (86° F.) before introduction into the reaction zone, and the TMP-MEKO mixture was held at room temperature. 0.1 parts by weight of dibutyl tin dilaurate (D-22) catalyst was added to catalyze the reaction. The peak temperature reached in the reaction zone is 165° C (329° F). The stoichiometry of the reactants, given in parts by weight, is as follows:

| Component | Parts by Weight | |
|---|---|---|
| 1. TMP | 22.5 | ⎫ A side |
| MEKO | 90.0 | ⎭ |
| 2. IPDI | 166.5 | ) B side |

The final properties of the curing agent produced are as follows:

| Final Properties | |
|---|---|
| Free NCO-Wt.% | 0.9% |
| Sag Temperature[1] | 167° F |
| Softening Point[1] | 179° F |
| Color[2] (50% solution) in xylol | less than 1 |

[1] Ring and ball apparatus
[2] Gardner-Holdt color standards

EXAMPLE II 2.15 grams of dibutyl tin dilaurate is added to 3375 grams of a TMP-MEKO mixture having the proportions indicated in Example I, which constitutes the input feed material for one input (the "A" side) to the reaction zone of a two component metering reaction apparatus (fluidyne Microshot 520 Model) of the type used conventionally for making urethane foam or solid urethane elastomer on a continuous basis. IPDI is utilized as the other input to the reaction zone (the "B" side). The "A" side and the "B" side metering rates are calibrated at 30° C to meter the feed materials in the proportions indicated in Example I, and the reactants are allowed to exotherm out of the machine at 160° C (320° F). The properties of the curing agent thus produced are as follows:

| Final Properties | |
|---|---|
| Free NCO-Wt.% | 0.77% |
| Sag Temperature[1] | 148° F |
| Softening Point[1] | 168° F |
| Color (50% solution in Xylol)[2] | Less than 1 |

[1] Ring and Ball apparatus
[2] Gardner-Holdt color standards

EXAMPLE III

A curing agent having the same components and molar ratio as in Example I is prepared by a conventional batch process employing a 20 gallon batch reactor. The properties of the reaction product are as follows:

| Final Properties | |
|---|---|
| Free NCO-Wt.% | Trace |
| Sag Temperature[1] | 161° F |
| Softening Point[1] | 186° F |
| Color[2] (50% solution in Xylol) | 7-8 |

[1] Ring and Ball apparatus
[2] Gardener-Holdt color standards

EXAMPLE IV

A blocked isocyanate polymer curing agent is prepared in a laboratory scale run by continuously introducing a mixture of trimethylol propane (TMP) and epsilon caprolactam (E-Cap) as one input feed to a reaction zone (the "A" side), and concurrently currently and stoichiometrically metering isophorone diisocyanate as the other input feed to the reaction zone (the "B" side). The IPDI is heated to 100° F before introduction into the reaction zone, and the TMP,E-Cap mixture is similarly preheated to 225° F. 0.15 parts by weight of dibutyl tin dilaurate (D-22) catalyst is added to the TMP,E-Cap mixture before reaction. The peak exotherm reached in the reaction is about 390° F after 75 seconds have elapsed.

| Formula | | |
|---|---|---|
| | | Parts by Weight |
| 1. TMP | | 21 ⎫ A side |
| E-Cap | | 103 ⎭ |
| 2. IPDI | | 155 ) B side |

The final free NCO level of the epsilon caprolactam blocked curing agent product was 1.1%.

EXAMPLE V

IPDI, preheated to 100° F, is used as one input feed of a metering reaction apparatus (Fluidyne Microshot 520 Model) (the "b" side) and a mixture of TMP, E-Cap having the proportion of Example IV and preheated to 225° F and including D-22 catalyst is used as the other input feed of the apparatus (the "A" side). The "A" and "B" sides are calibrated to meter the component feeds at the proportions indicated in Example IV into a reaction zone, and the mixed reactants are allowed to come out of the machine into a preheated coil (21 feet × 5/16 inch) proportioned to give 60 seconds residence time at the feed rate used. The peak temperature reached is 385° F out of the coil. The final free NCO of the reaction product is less than 0.8 weight percent. Sag temperature is 190° F, and the softening point is 213° F.

EXAMPLE VI

A series of paint formulations is prepared utilizing the curing agents of Examples II and IV with a commercial polyester sold under the trade designation Cargill 9000, and the results are compared with similar films prepared using batch-processed curing agents of substantially the same component composition. The compositions in parts by weight and the results are as follows:

| | Paint Formulas | | | |
|---|---|---|---|---|
| Component | MEKO Continuous | MEKO Batch Control | E-cap Continuous | E-cap Batch Control |
| 1. Cargill 9000 | 800.0 | 800 | 800.00 | 800 |
| 2. R-900[a] | 487.0 | 487 | 487.0 | 487 |
| 3. L-5310[b] | 7.3 | 7.3 | 7.3 | 7.3 |
| 4. Product of Example II | 174.5 | — | — | — |
| 5. IPDI-TMP-MEKO Batch Product corresponding to Example II | — | 174.5 | — | — |
| 6. Product of Example IV | — | — | 174.5 | — |
| 7. IPDI-TMP-Ecap Batch Product corresponding to Example IV | — | — | — | 174.5 |

[a]rutile titanium dioxide from DuPont
[b]silicone surfactant flow control agent from Union Carbide

| | Film Performance | | | |
|---|---|---|---|---|
| Bake Cycle | 30' at 320° F | 30' at 320° F | 30' at 360° F | 30' at 360° F |
| Gloss 60° | 94 | 96 | 96 | 93 |
| Gloss 20° | 81 | 83 | 83 | 80 |
| Pencil Hardness | H | H | H | H |
| Flexibility, T-bend | 1T | 2T | 0T | 0T |
| Impact, Aluminum | | | | |
| Direct | 60 | 60 | 60 | 60 |
| Reverse | 60 | 60 | 50 | 60 |
| Impact, Bond. 1000 | | | | |
| Direct | 160 | 160 | 160 | 160 |
| Reverse | 160 | 160 | 120 | 160 |
| Film Appearance | Some blistering of film thickness over 1.5 mils | Some blistering of film thickness over 1.5 mils | Slight orange peel | Slight orange peel |
| 100 MEK Double rubs | Softens and loss of gloss, film recovers | | | |
| Color Difference | Continuous | Batch Control | Continuous | Batch Control |
| L | 93.5 | 95.5 | 93.5 | 93.7 |
| aL | −1.4 | −1.4 | −1.4 | −1.4 |
| bL | +0.2 | +4.8 | +0.1 | +0.3 |

EXAMPLE VII

Several blocked isocyanate compositions are prepared by continuously and stoichiometrically introducing and reacting different combinations of isocyanate, polyol and blocking agents, as follows:

| | Parts by Wt. |
|---|---|
| 1. IPDI | 450 |
| PCP-0300* | 247 |
| E-Cap. | 305 |
| D-22 Catalyst | 0.15 |
| *PCP-0300 polycaprolactone polyol from Union Carbide | |
| Free NCO | 0.6 |
| Soft. Point, Ring & Ball | 183 |
| 2. IPDI | 444 |
| 1,4 Butane Diol | 90 |
| E-Cap. | 226 |
| D-22 Catalyst | 0.15 |
| Free NCO | 0.72 |
| Soft. Point, Ring & Ball | 175 |
| 3. IPDI | 497 |
| Theic* | 166 |
| E-Cap. | 337 |
| D-22 Catalyst | 0.15 |
| Free NCO | 0.8 |
| Soft. Point, Ring & Ball | 167° F |

*Theic - Tris (hydroxy ethyl) isocyanurate from Allied Chemical.

EXAMPLE VIII

A blocked prepolymer employing toluene diisocyanate is produced by continuously and stoichiometrically metering and reacting the following components in the indicated proportions:

| | Parts by Weight | |
|---|---|---|
| Toluene diisocyanate | 505 | B side |
| Trimethylol propane | 135 | A side |
| Epsilon caprolactam | 316.5 | |

The reaction is highly exothermic and produces a peak temperature of 350° F, with a residence time of 60 seconds. The product is not sent through a coil, but rather an open trough where the exotherm is allowed to take place. Final properties of the product are:

| | |
|---|---|
| Free NCO, Wt. % | 0.85 |
| Softening point, Ring & Ball | 240° F |
| Color (Gardner-Holdt) 50% Xylol | less than 1 |

An epsilon-caprolactam blocked TDI composition was produced only with difficulty in a laboratory scale batch process, and on a pilot batch reactor scale, there were difficulties in dissolving epsilon caprolactam and in generation of excessive foam due to side reactions.

It will be appreciated that in accordance with the present invention, an improved method for the production of blocked isocyanate curing agent has been provided. While the invention has been particularly described with respect to a number of specific embodiments, it will also be appreciated that various modifications thereof will be apparent to those skilled in the art and are intended to be included in the spirit and scope of the present invention.

Various of the features of the present invention are set forth in the following claims.

What is claimed is:

1. A method for manufacturing blocked isocyanate curing agents which are the reaction product of a polyfunctional isocyanate and a blocking agent for the isocyanate which is capable of splitting from the curing agent at elevated temperature to regenerate isocyanate functionality, comprising the steps of separately and continuously metering a polyisocyanate and a blocking agent for said polyisocyanate into a reaction zone in stoichiometric proportion to provide a reaction mixture in the reaction zone at reaction temperature, said stoichiometric proportion being based on the deficient or excess isocyanate functionality of said reaction mixture, and continuously withdrawing the reaction mixture from said reaction zone to provide a blocked isocyanate curing agent reaction product after maintaining said reaction mixture in the reaction zone for a time sufficient to reduce the free isocyanate functionality of the reaction product to at least a predetermined level indicating substantial completion of the blocking reaction.

2. A method in accordance with claim 1 wherein said blocking agent is selected from the group consisting of epsilon caprolactam, and methyl ethyl ketoxime.

3. A method in accordance with claim 1 wherein said polyisocyanate is selected from the group consisting of isophorone diisocyanate, toluene diisocyanate, isocyanatepolyol prepolymers and mixtures thereof.

4. A method in accordance with claim 1 wherein said isocyanate is an isocyanate polyol prepolymer.

5. A method in accordance with claim 1 wherein a polyol is metered into said reaction zone simultaneously with said polyisocyanate and said blocking agent and wherein said excess isocyanate functionality is calculated to account for the reaction of said polyisocyanate with said polyol.

6. A method in accordance with claim 1 wherein said reaction mixture is maintained in said reaction zone for a period of time in the range of from about 15 to about 300 seconds.

7. A method in accordance with claim 1 wherein said reaction zone is maintained at a temperature in the range of from about 250 to about 400° F.

8. A method in accordance with claim 1 wherein said reaction mixture is maintained in said reaction zone for a period of time sufficient to provide a free isocyanate level in said reaction product of less than about 1%.

9. A method in accordance with claim 1 wherein a catalyst is employed to generate a peak reaction exotherm reaction in the reaction zone.

10. A method in accordance with claim 1 wherein a reaction temperature above the unblocking temperature of said blocking agent in respect of said polyisocyanate is maintained in said reaction zone.

11. A method in accordance with claim 1 wherein an effective reaction time and temperature below the unblocking temperature of said blocking agent in respect of said polyioscyanate is maintained in said reaction zone.

* * * * *

UNITED STATES PATENT AND TRADEMARK OFFICE
CERTIFICATE OF CORRECTION

PATENT NO. : 4,055,551
DATED : October 25, 1977
INVENTOR(S) : Panandiker, et al.

It is certified that error appears in the above-identified patent and that said Letters Patent are hereby corrected as shown below:

Column 1, line 26, "repolymer" should read --prepolymer--.

Column 3, line 12, "4,4=" should read --4,4'--.

Column 7, lines 33 and 34, "(50% solution) in xylol" should read --(50% solution in xylol)--.

Column 8, lines 19 and 20, "currently" should be deleted.

Column 8, line 45, "b" should read --B--.

Column 9, second table, "Gloss 20°" should read --20°--.

Column 12, Claim 11, line 26, "polyioscyanate" should read --polyisocyanate--.

Signed and Sealed this

Sixth Day of June 1978

[SEAL]

Attest:

RUTH C. MASON
*Attesting Officer*

DONALD W. BANNER
*Commissioner of Patents and Trademarks*